(12) United States Patent
Acosta

(10) Patent No.: US 7,594,669 B2
(45) Date of Patent: Sep. 29, 2009

(54) HALLOWEEN PORTABLE CONTAINER

(76) Inventor: Linda Acosta, 311 S. Oak Ave., Bartlett, IL (US) 60103

( * ) Notice: Subject to any disclaimer, the term of this patent is extended or adjusted under 35 U.S.C. 154(b) by 0 days.

(21) Appl. No.: 11/803,306

(22) Filed: May 14, 2007

(65) Prior Publication Data
US 2008/0284138 A1  Nov. 20, 2008

(51) Int. Cl.
*B62D 3/02* (2006.01)
(52) U.S. Cl. ................. 280/79.5; 280/47.34
(58) Field of Classification Search .......... 280/79.5, 280/47.34, 47.371, 47.41
See application file for complete search history.

(56) References Cited

U.S. PATENT DOCUMENTS

| | | | |
|---|---|---|---|
| 2,683,012 A * | 7/1954 | Reinsma .................. 248/129 |
| 3,024,555 A * | 3/1962 | Abeles ..................... 40/331 |
| 3,774,931 A | 11/1973 | Steiniceanu |
| D258,205 S | 2/1981 | Kroll |
| 4,596,397 A | 6/1986 | Conti |
| 4,876,766 A * | 10/1989 | Cohen ..................... 16/426 |
| 4,989,889 A | 2/1991 | Server Perez |
| 5,584,399 A | 12/1996 | King |
| 5,678,842 A | 10/1997 | Hook et al. |
| 5,735,548 A | 4/1998 | Anderson |
| 5,797,507 A * | 8/1998 | Kramer ..................... 220/4.23 |
| 6,024,376 A | 2/2000 | Golichowski et al. |
| 6,131,928 A * | 10/2000 | Tung ..................... 280/47.315 |
| 6,341,406 B1 * | 1/2002 | Beckman ..................... 16/113.1 |
| 6,363,568 B1 * | 4/2002 | Harrison et al. .............. 15/167.1 |
| 6,505,843 B1 * | 1/2003 | Williams ................. 280/47.26 |
| 6,619,810 B2 | 9/2003 | Kramer et al. |
| 6,726,227 B2 * | 4/2004 | Morgan ..................... 280/47.35 |

* cited by examiner

*Primary Examiner*—Christopher P Ellis
*Assistant Examiner*—John D. Walters
(74) *Attorney, Agent, or Firm*—Valauskas & Pina LLC

(57) ABSTRACT

The present invention is an apparatus that is portable, easy to transport, and protects confections during Halloween "trick-or-treat". The apparatus of the present invention includes a container element including a cover element, wherein the container element and cover element are in the form of a Halloween object, such as a pumpkin, witch, ghost, goblin, monster, vampire or werewolf. The apparatus further includes a projection element, which may further include a gripping element, to assist in maneuvering to push and/or pull the apparatus, via a rotating element. An alternate embodiment of the present invention is contemplated that includes a frame element to allow the container element to be disengaged from the frame element such that the container can be used as a decorative piece, for example displayed on a front porch or kitchen counter.

7 Claims, 4 Drawing Sheets

HALLOWEEN PORTABLE CONTAINER

FIELD OF THE INVENTION

The present invention relates to a portable container, and more particularly to a portable container for storing confections received by a donee from a donor, such as during Halloween "trick-or-treating".

BACKGROUND OF THE INVENTION

Halloween is a tradition celebrated on the night of October 31, most notably by children dressing in costumes and going door-to-door collecting confections, such as sweets, fruit, and other gifts. "Trick-or-treating", also known as guising, is an activity for children on Halloween in which they proceed from house to house in costumes, asking for confections with the question, "trick or treat?". Guising is one of the main traditions of Halloween. It has become socially expected that if one lives in a neighborhood with children to purchase confections in preparation for trick-or-treaters.

Typically, children collect confections in containers, such as bags, backpacks, cases, duffel bags, handbags, knapsacks, pillowcases and even the popular orange plastic pail resembling a pumpkin. As more confections are received, the container becomes weighted and difficult to carry or transport from house to house. Additionally, the containers traditionally used do not have a cover, such as a lid, to prevent the confections from falling out of the container or becoming damaged from weather elements, such as rain.

Therefore, there is a demand for an apparatus that is portable and easy to transport while collecting confections during Halloween "trick-or-treat". Likewise, there is a demand for an apparatus that protects and secures the confections. The present invention satisfies these demands.

SUMMARY OF THE INVENTION

The apparatus of the present invention includes a container element. The container element can be of any size, shape or configuration. Likewise, the container element can be manufactured of any material, such as plastic, metal, nylon to name a few. It is contemplated that the container can be in the form of a pumpkin, witch, ghost, goblin, monster, vampire, werewolf, or any other Halloween related object.

The container element includes a cover element. The cover element can be removable or removably connected to the container element. The cover element can be removably connected to the container element via a hinge element, such as a joint, hook, pin, spring, string, and swivel, to name a few. The cover element can be of any size, shape or configuration to further complement the container element. Likewise, the cover element can be manufactured of any material, such as plastic, metal, nylon to name a few. For example, the cover can be the stem of a pumpkin wherein the container element is a pumpkin body.

The apparatus further includes a projection element, which may further include a gripping element. The projection element, such as an arm or rod, assists in maneuvering, driving or controlling the apparatus, for example pushing and/or pulling. The projection element can be of any size, shape or configuration as well as manufactured of any material, such as plastic, metal, nylon to sufficiently drive the apparatus.

The projection element may further include a collapsed state and deployed state. For example, the projection element can telescope or pivot between the two states. The projection element may further include a locking element, such as a snap-fit fastener, to secure it into either state. The deployed state allows easy maneuvering of the apparatus while the collapsed state is ideal for storage or display of the apparatus. It is also contemplated that the projection element includes a fulcrum element, such as a pin-socket arrangement or lever, so that the projection element can swivel horizontally and/or vertically to assist in maneuvering, driving or controlling the apparatus.

The gripping element assists in holding or griping the projection element and further assists in maneuvering, driving or controlling the apparatus. It is contemplated the gripping element can be any size, shape or configuration, and manufactured of any material, including an edible confection. For example, the gripping element can be a pumpkin, witch, ghost, goblin, monster, vampire, werewolf, or any other Halloween related object.

The apparatus further includes a rotating element that effects motion. For example, the rotating element can be castors, wheels, rollers, discs, to name a few and can further be unidirectional or multi-directional. The rotating element rotates or revolves and can further spin or swivel. A support element, such as an axle, pole, shaft, rod, spindle or stem can either combine two or more rotating elements or attach the rotating element directly to the container element. It is further contemplated that the rotating element can include an anchoring element. When the anchoring element is activated, the rotating element is anchored to prevent motion and stabilize the apparatus, for example on an incline.

In one embodiment, the container element is attached to the support element, which is further connected to the rotating element. An alternate embodiment of the present invention is contemplated that includes a frame element. The support element and/or the rotating element can be connected to the frame element. The container element is secured or removably secured to the frame element via a securing element, such as a bolt, clamp, clasp, fastener, hook, or latch, to name a few. Thus, the container element can be disengaged from the frame element such that the container element can be used as a decorative piece, for example displayed on a front porch or kitchen counter. It is also contemplated that a container element can be interchangeable with another container element. A container element, such as in the form of a pumpkin, can be disengaged from the frame element and replaced with another container element, such as in the form of a witch.

An object of the present invention is to easily carry or transport confections during Halloween "trick-or-treat".

Another object of the present invention is to secure the confections, such that they do not fall out of the container.

Another object of the present invention is to protect the confections, for example, from heat, rain and snow.

Another object of the present invention is to enhance safety during Halloween "trick-or-treat". Any of the elements of the present invention can possess the property to "glow-in-the-dark".

Another object of the present invention is to provide holiday décor.

The present invention and its attributes and advantages will be further understood and appreciated with reference to the detailed description below of presently contemplated embodiments, taken in conjunction with the accompanying drawings.

DETAILED DESCRIPTION OF EMBODIMENTS OF THE INVENTION

Figure 1:
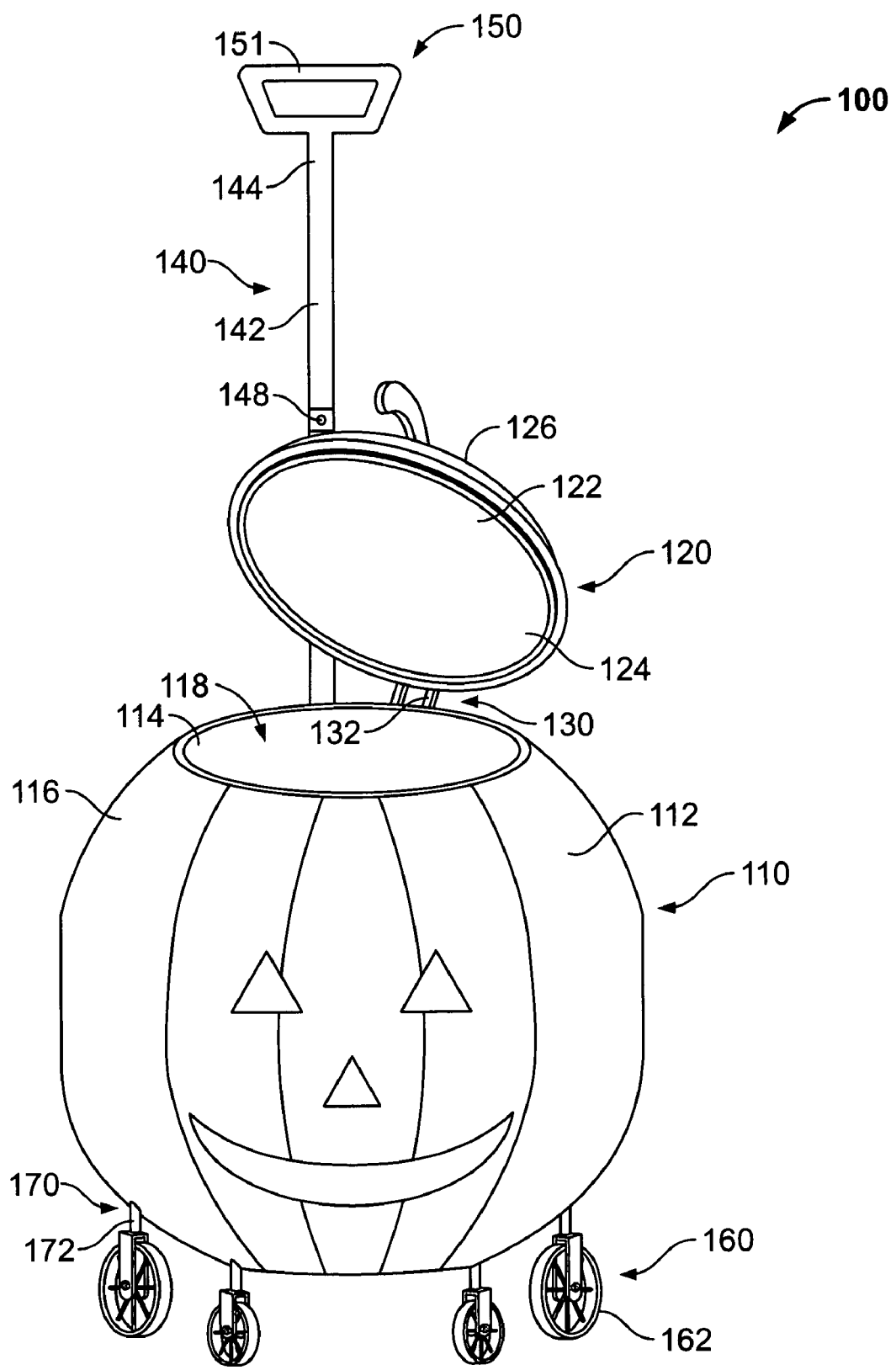
FIG. 1 illustrates a perspective view of one embodiment of the apparatus according to the present invention.
Figure 2:
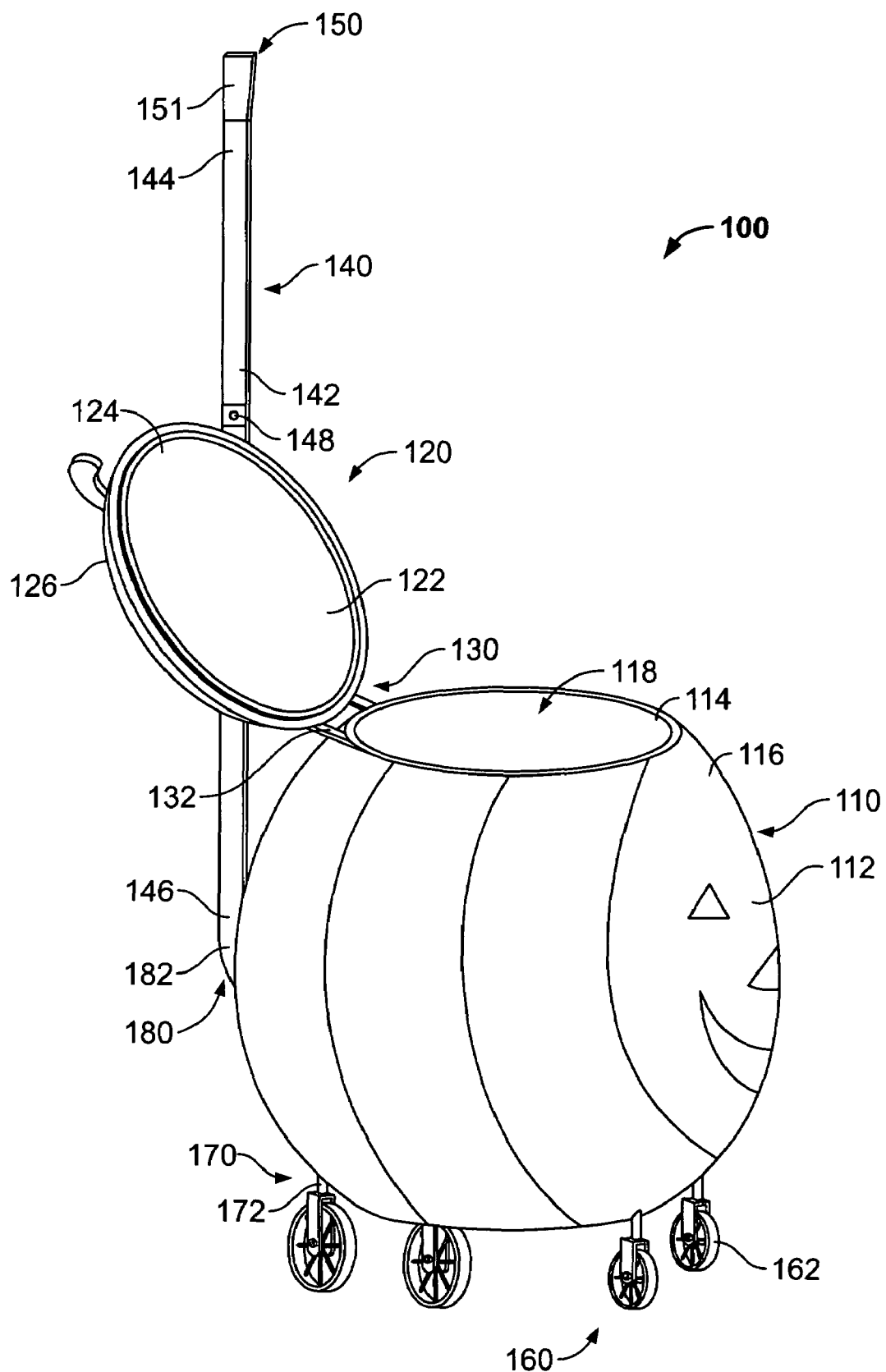
FIG. 2 illustrates a side view of the embodiment of FIG. 1 of the apparatus according to the present invention.

FIG. 1 illustrates a perspective view of one embodiment of the apparatus according to the present invention. FIG. 2 illustrates a side view of the embodiment of FIG. 1 of the apparatus according to the present invention.

The apparatus 100 includes a container element 110 including a cover element 120. As shown in FIGS. 1 and 2, the container element 110 is a pumpkin 112 and the cover element 120 is a stem 122. The container element 110 includes an interior surface 114 and an exterior surface 116, wherein the interior surface 114 defines a receptacle 118 into which confectioneries are received. The cover element 120 includes an inside surface 124 and an outside surface 126. The hinge element 130, here a joint 132, removably connects the container element 110 and cover element 120. When closed, the interior surface 114 of the container element 110 substantially abuts the inside surface 124 of the cover element 120 to close the receptacle 118.

The apparatus 100 includes a projection element 140 that further includes a gripping element 150. The projection element 140 includes a proximal end 144 and a distal end 146. The projection element 140 is a telescoping rod 142 shown in the deployed state in FIGS. 1 and 2. The distal end 146 of the projection element 140 is attached to said container element 110. A locking element 148 secures the rod 142 in the deployed state, and can be positioned anywhere on the projection element 140. Here, the locking element 148 is shown approximately between the proximal end 144 and the distal end 146. The locking element 148 is disengaged to place the rod 142 in the collapsed state (not shown).

The gripping element 150, here a knob 151, is located at the proximal end 144 of the projection element 140 and assists in holding or griping the rod 142 for pushing and/or pulling the apparatus 100. The projection element 140 further includes a fulcrum element 180 shown in FIG. 2 at the distal end 146, here a pin-socket arrangement 182, which allows the rod 142 to swivel horizontally and/or vertically for maneuvering the apparatus 100.

The apparatus 100 further includes a rotating element 160 that effects motion. As shown in FIGS. 1 and 2, the rotating element 160 is a wheel 162, which is multi-directional. The wheel 162 is attached to a support element 170, here a spindle 172, which is attached to the pumpkin 112. In this embodiment, the container element 110 is attached to the support element 170 and further to the rotating element 160.

Figure 3:
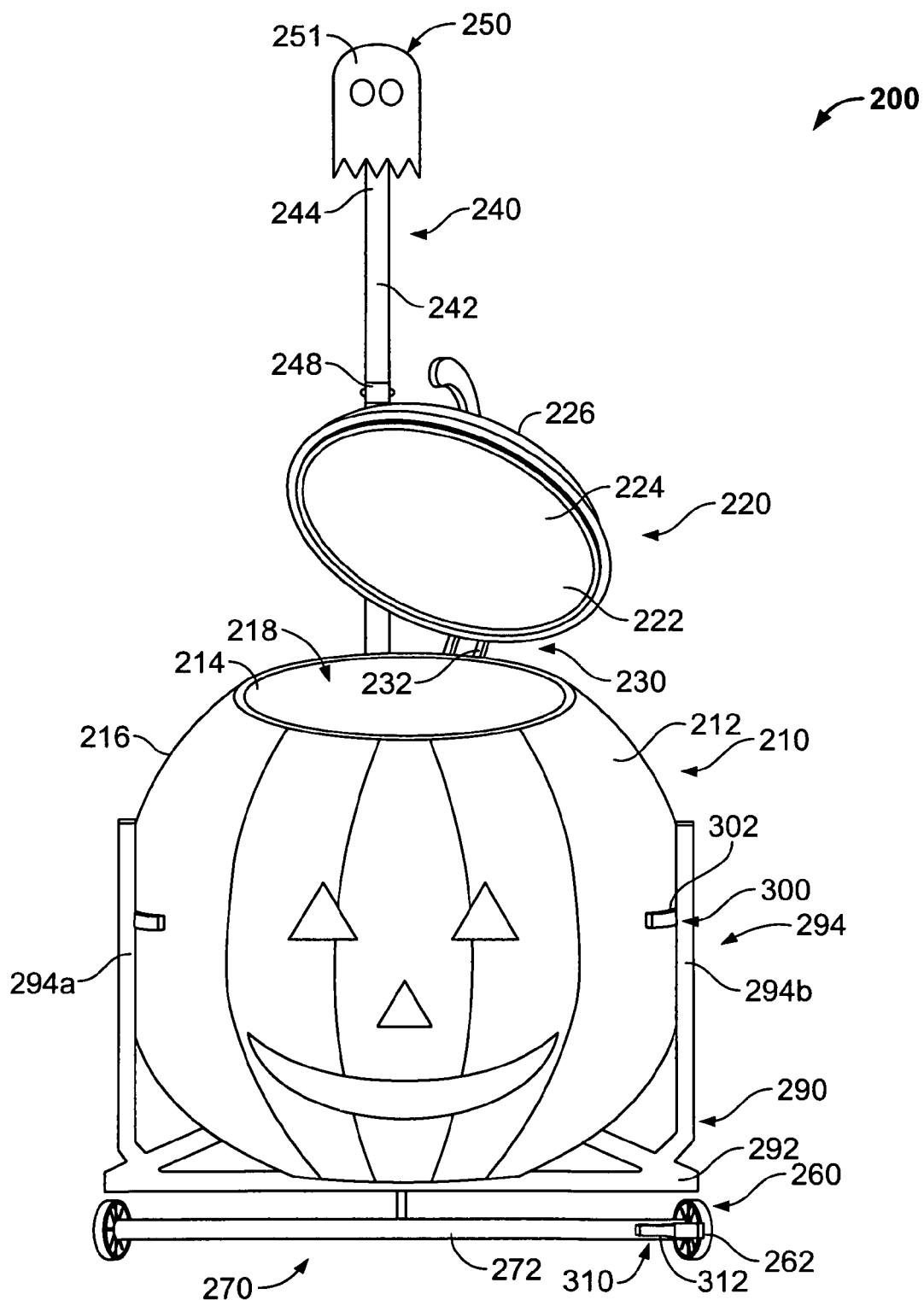
FIG. 3 illustrates a perspective view of an alternate embodiment of the apparatus according to the present invention.
Figure 4:
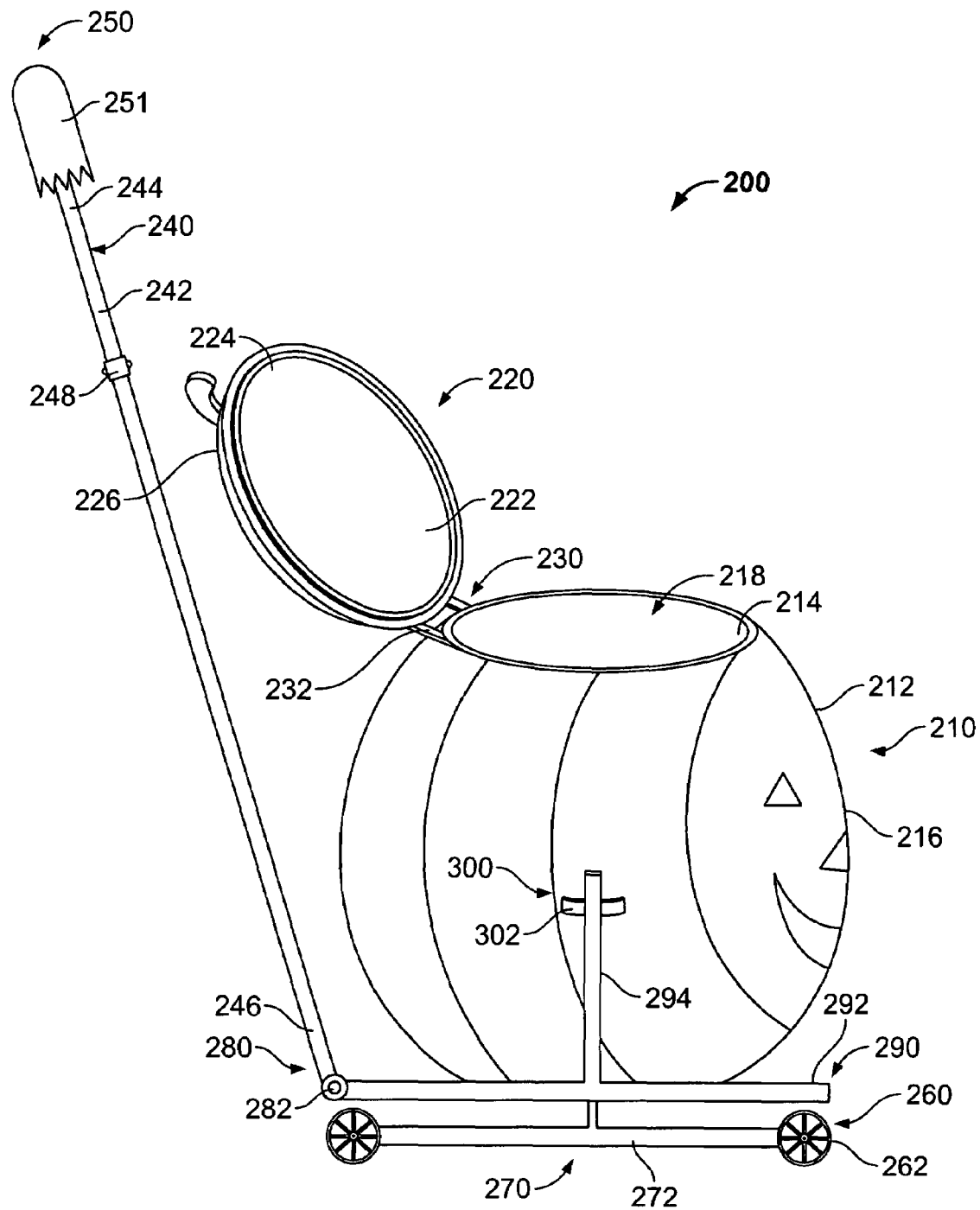
FIG. 4 illustrates a side view of the embodiment of FIG. 3 of the apparatus according to the present invention.

FIG. 3 illustrates a perspective view of an alternate embodiment of the apparatus according to the present invention. FIG. 4 illustrates a side view of the embodiment of FIG. 3 of the apparatus according to the present invention.

The apparatus 200 includes a container element 210 including a cover element 220. As shown in FIGS. 3 and 4, the container element 210 is a pumpkin 212 and the cover element 220 is a stem 222. The container element 210 includes an interior surface 214 and an exterior surface 216, wherein the interior surface 214 defines a receptacle 218 into which confectioneries are received. The cover element 220 includes an inside surface 224 and an outside surface 226. The hinge element 230, here a pin 232, removably connects the container element 210 and cover element 220. When closed, the interior surface 214 of the container element 210 substantially abuts the inside surface 224 of the cover element 220 to close the receptacle 218.

The apparatus 200 includes a projection element 240 that further includes a gripping element 250. The projection element 240 includes a proximal end 244 and a distal end 246. The projection element 240 is a retractable arm 242 shown in the deployed state in FIGS. 3 and 4. A locking element 248 secures the retractable arm 242 in the deployed state, and can be positioned anywhere on the projection element 240. Here, the locking element 248 is a snap-fit fastener and is positioned approximately between the proximal end 244 and the distal end 246 of the projection element 240. The locking element 248 is disengaged to place the retractable arm 242 in the collapsed state (not shown).

The gripping element 250, here in the form of a ghost 251, is located at the proximal end 244 of the projection element 240 and assists in holding or griping the retractable arm 242 for pushing and/or pulling the apparatus 200. The projection element 240 further includes a fulcrum element 280 shown in FIG. 4 at the distal end 246, here lever 282, which allows the retractable arm 242 to swivel horizontally and/or vertically for maneuvering the apparatus 200.

This embodiment of apparatus 200 further includes a frame element 290 to which the container element 210 is secured. Frame element 290 includes a base portion 292 and a side portion 294. Side portion 294 includes a first side portion 294a and a second side portion 294b. The container element 210 is secured or removeably secured to the frame element 290 via a securing element 300, here a hook and loop fastener 302, located on the side portion 294 of the frame element 290. The container element 210 is placed on the base portion 292 between the first side portion 294a and the second side portion 294b of the frame element 290. The container element 210 is secured to the frame element 290 by engaging the securing element 300. The securing element 300 can be disengaged to unsecure the container element 210 from the frame element 290 such that the container element 290 can be used as a decorative piece, for example displayed on a front porch or kitchen counter.

The apparatus 200 further includes a rotating element 260 that effects motion. As shown in FIGS. 3 and 4, the rotating element 260 is a castor 262. The castor 262 is attached to a support element 270, here an axle 272, which is attached to the frame element 290, although it is contemplated that the rotating element 260 can be attached directly to the frame element 290.

In another embodiment, the apparatus 200 includes an anchoring element 310. As shown in FIG. 3, the anchoring element 310 is a foot brake 312 although any anchoring element 310 is contemplated, such as a hand brake, latch, lever to name a few. When the foot brake 312 is activated, the castor 262 is anchored to prevent motion of the apparatus 200.

While the disclosure is susceptible to various modifications and alternative forms, specific exemplary embodiments thereof have been shown by way of example in the drawings and have herein been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

What is claimed is:

1. An apparatus for receiving confections during Halloween guising, comprising:

a frame element including a base portion and a side portion including a first side portion and a second side portion;

a container element including an interior surface defining a receptacle and an exterior surface, wherein said container element is in the form of one from the group of a pumpkin, witch, ghost, goblin, monster, vampire and werewolf;

a securing element, wherein said securing element removeably secures said container element on said base portion between said first side portion and said second side portion of said frame element;

a support element with a first end and a second end, wherein said first end of said support element is attached to said frame element and said second end of said support element is attached to a plurality of wheels; and a projection element to control said plurality of wheels, said projection element including a proximal end and a distal end attached to said frame element.

2. The apparatus for receiving confections during Halloween guising according to claim 1 further comprising a cover element.

3. The apparatus for receiving confections during Halloween guising according to claim 2 further comprising a hinge element, wherein said hinge element removeably connects said container element and said cover element.

4. The apparatus for receiving confections during Halloween guising according to claim 1 further comprising a gripping element, wherein said gripping element is connected to said proximal end of said projection element.

5. The apparatus for receiving confections during Halloween guising according to claim 1 further comprising a fulcrum element to allow said projection element to swivel horizontally and/or vertically to assist in maneuvering the apparatus.

6. The apparatus for receiving confections during Halloween guising according to claim 1 wherein said projection element includes a deployed state and a collapsed state such that a locking element engages to secure said projection element in said deployed state and disengages to secure said projection element in said collapsed state.

7. The apparatus for receiving confections during Halloween guising according to claim 1 further comprising an anchoring element, wherein said anchoring element locks said plurality of wheels to prevent motion of the apparatus.

* * * * *

UNITED STATES PATENT AND TRADEMARK OFFICE
CERTIFICATE OF CORRECTION

PATENT NO. : 7,594,669 B2 Page 1 of 1
APPLICATION NO. : 11/803306
DATED : September 29, 2009
INVENTOR(S) : Linda Acosta It is certified that error appears in the above-identified patent and that said Letters Patent is hereby corrected as shown below:

Title page, item (74), after "Valauskas &", delete "Pina" and insert --Pine--.

Signed and Sealed this

First Day of December, 2009

David J. Kappos
*Director of the United States Patent and Trademark Office*